US008647586B2

(12) United States Patent
Shulenberger et al.

(10) Patent No.: US 8,647,586 B2
(45) Date of Patent: Feb. 11, 2014

(54) DEVICE FOR CONVERSION OF BIOMASS TO BIOFUEL

(75) Inventors: Arthur M Shulenberger, Millbrae, CA (US); Mark Wechsler, San Mateo, CA (US)

(73) Assignee: Renewable Fuel Technologies, Inc., San Mateo, CA (US)

( * ) Notice: Subject to any disclaimer, the term of this patent is extended or adjusted under 35 U.S.C. 154(b) by 170 days.

(21) Appl. No.: 13/042,356

(22) Filed: Mar. 7, 2011

(65) Prior Publication Data

US 2011/0214343 A1 Sep. 8, 2011

Related U.S. Application Data

(60) Provisional application No. 61/311,696, filed on Mar. 8, 2010.

(51) Int. Cl.
*B01J 8/00* (2006.01)

(52) U.S. Cl.
USPC ............... 422/200; 422/198; 202/86; 202/96; 202/124

(58) Field of Classification Search
USPC ........................ 202/86, 96, 124; 422/198, 200
See application file for complete search history.

(56) References Cited

U.S. PATENT DOCUMENTS

| 4,553,978 | A | * | 11/1985 | Yvan | 44/280 |
| 4,787,917 | A | * | 11/1988 | Leclerc de Bussy | 44/606 |
| 5,057,189 | A | | 10/1991 | Apffel | |
| 6,991,769 | B2 | | 1/2006 | Kaneko et al. | |
| 7,578,927 | B2 | | 8/2009 | Marker et al. | |
| 7,816,570 | B2 | | 10/2010 | Roberts, IV et al. | |
| 7,893,307 | B2 | * | 2/2011 | Smith | 585/241 |
| 7,942,942 | B2 | * | 5/2011 | Paoluccio | 44/605 |
| 8,063,258 | B2 | | 11/2011 | Bartek et al. | |
| 8,105,400 | B2 | | 1/2012 | Bergman | |
| 8,217,212 | B2 | * | 7/2012 | Paoluccio et al. | 585/242 |
| 2007/0094929 | A1 | | 5/2007 | Kang et al. | |
| 2008/0229653 | A1 | | 9/2008 | Iversen et al. | |
| 2009/0031615 | A1 | | 2/2009 | Joshi et al. | |

FOREIGN PATENT DOCUMENTS

JP 10-251671 A 9/1998
KR 10-0590973 B1 6/2006

OTHER PUBLICATIONS

International Search Report PCT/US2009/060632, May 31, 2010.
International Search Report PCT/US2011/027449, Dec. 7, 2011.
United States Patent and Trademark Office, Office Action for U.S. Appl. No. 12/576,157, Oct. 2, 2012.
International Preliminary Report on Patentability PCT/US2011/027449, Sep. 11, 2012.

* cited by examiner

*Primary Examiner* — Nina Bhat
(74) *Attorney, Agent, or Firm* — Steven R. Vosen (57) ABSTRACT

Described is an apparatus to convert carbonaceous materials, particularly biomass and those biomass resources which are remotely located, into a high performance solid fuel. The biomass processing system, provides a continuous process which can be completely powered by the energy contained in the biomass. The heat, mechanical power and electrical power are provided from the energy in the biomass, through the methods described. In this way, the apparatus is free to operate in remote locations, where no power or auxiliary fuel sources are available.

17 Claims, 9 Drawing Sheets

DEVICE FOR CONVERSION OF BIOMASS TO BIOFUEL

CROSS-REFERENCE TO RELATED APPLICATIONS

This application claims the benefit of U.S. Provisional Application No. 61/311,696 filed Mar. 8, 2010. The entire contents of the above-listed provisional application are hereby incorporated by reference herein and made part of this specification.

BACKGROUND OF THE INVENTION

1. Field of the Invention

The present invention generally relates to the processing of biomass, and more particularly to a self-contained method and system for generating solids from biomass.

2. Discussion of the Background

The use of solid fuels is the world's largest energy market. In the United States, solid fuels are used primarily for generating electric power and in metallurgic and cement manufacturing processes. This market is dominated by non-renewable resources, principally coal, and to a lesser extent petroleum coke. Biomass sources, which are generally considered to be renewable, form less than 5% of the U.S. Market.

There is an urgency to switch to energy sources that will have less of an environmental impact, especially with regards to the emission of greenhouse gases. Biomass sources are an attractive alternative to conventional solid fuels, but high transportation costs and low energy density of the biomass materials have hindered their widespread use.

Methods to improve the fuel value and physical properties of biomass range include drying the biomass to remove moisture without chemically altering the biomass, and producing charcoal from the biomass, where the biomass is chemically altered into fixed carbon. Drying is accomplished at temperatures below 120 C, while charcoal production requires temperatures above 500 C. Both drying and producing charcoal are incomplete solutions, and do not enable the access to remote biomass resources.

Drying the biomass combined with grinding and pelletizing the resultant fuel produces a fuel with energy density of between 7,000 Btu per pound (16,000 kJ/kg) and 8,000 Btu per pound (19,000 kJ/kg), and a density of 0.6 g/cm$^3$ (600 kg/m$^3$) and 1 g/cm$^3$ (1,000 kg/m$^3$), and is something of an improvement. However the pellets are intolerant to water, are capable of spontaneous combustion, and are thus difficult to store.

Producing charcoal is inefficient, with only 20% to 30% of the energy in the original biomass preserved in the charcoal. So much energy is lost that producing charcoal for fuel is discouraged except for use in metallurgical processes, where it is mandatory and thus unavoidable. In addition, densifying charcoal requires a binder, a severe limitation when operating remotely. In either case, the resultant fuel is unsatisfactory for widespread application to industrial combustion processes.

Thus there is a need in the art for a method and apparatus that permits for the widespread use of biomass as a solid fuel. Such a method and apparatus should be inexpensive to implement and should produce a fuel that is compatible with apparatus that use conventional solid fuels.

BRIEF SUMMARY OF THE INVENTION

Certain embodiments described herein overcome the disadvantages of the prior art by torrefaction, and pellitization of the resulting biomass. The biofuel thus produced may have an energy density superior to lower grade fossil coals, and physical properties, such as density, grindability, or water tolerance, that are compatible with industry needs.

Certain other embodiments described herein overcome the disadvantages of the prior art by utilizing the energy content in gasses driven off during torrefaction to operate the biomass-to-biofuel process, resulting in a self contained fuel production facility, requiring only biomass for steady state operation. Specifically, torrefaction typically produces low energy value gas products, i.e. acetic acid and methanol, which contain energy which has been lost to the solids. Certain embodiments recover the thermal energy in the gas and/or convert the gas to electrical energy in a heat engine.

Embodiments presented herein overcome the disadvantages of prior art by remotely converting biomass to a biofuel. For example, one embodiment is an apparatus that may be placed near a source of biomass and processes the biomass into a biofuel, which is then transported to market. Such apparatus has several advantages. First, the biomass can be converted to a biofuel that is more generally usable than the raw biomass. Second, biofuels have a higher energy density than biomass, thus reducing the transportation cost per energy stored within the fuel. Third, previously uneconomic biomass resources, particularly remote resources, can be economically brought to market.

In certain embodiments, the apparatus and method converts carbonaceous materials, such as biomass which may be remotely located, into a high performance solid fuel for use in industrial combustion processes. The apparatus and method may provide a continuous process which can be completely powered by the energy contained in the biomass. Thus the heat, mechanical power and electrical power may be provided from the energy in the biomass. The apparatus is thus free to operate in remote locations, where no power or auxiliary fuel sources are available. In certain embodiments, utility services and/or auxiliary fuel may be available and may be utilized to simplify the apparatus.

In certain embodiments, it is possible to operate only from the biomass and generate a biofuel having between 70% and 90% of the original energy of the biomass, on a dry basis.

In one embodiment, one or more heat exchangers heat and/or cool the biomass using the phase change of a heat transfer medium. The phase change occurs on a surface of the heat exchanger that is in thermal contact with the biomass.

Certain embodiments provide a method for converting a biomass into a coal-like biofuel within an apparatus comprising a heat transfer fluid in a closed-loop heat transfer circuit. The method includes torrefying the biomass utilizing heat by extracting heat from the heat transfer fluid, where the torrefying produces a torrefaction gas and the biofuel; exothermically reacting the torrefaction gas; and heating the heat transfer fluid from the reacted torrefaction gas.

Certain other embodiments provide an apparatus for converting a biomass into a coal-like biofuel. The apparatus includes: a closed-loop heat transfer circuit having a heat transfer fluid; a heat exchanger having an input for accepting biomass, a first output for providing torrefied biomass, a second output for providing torrefaction gases, and a surface in contact with condensing heat transfer fluid of the heat transfer circuit for condensing the heat transfer fluid; and a chemical reactor for extracting chemical energy from the torrefaction gases and boiling the heat transfer fluid.

Yet certain other embodiments provide a method for converting a biomass into a coal-like biofuel. The method includes drying the biomass to form steam; and providing heat from the steam to a heat engine.

Certain embodiments provide an apparatus for converting a biomass into a coal-like biofuel. The apparatus includes: a heat exchanger having an input for accepting biomass, a first output for providing at least partially dried biomass, a second output for providing steam obtained from the biomass; and a heat engine to generate electricity from heat extracted from the steam.

These features together with the various ancillary provisions and features which will become apparent to those skilled in the art from the following detailed description, are attained by the apparatus and method of the present invention, preferred embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 1:
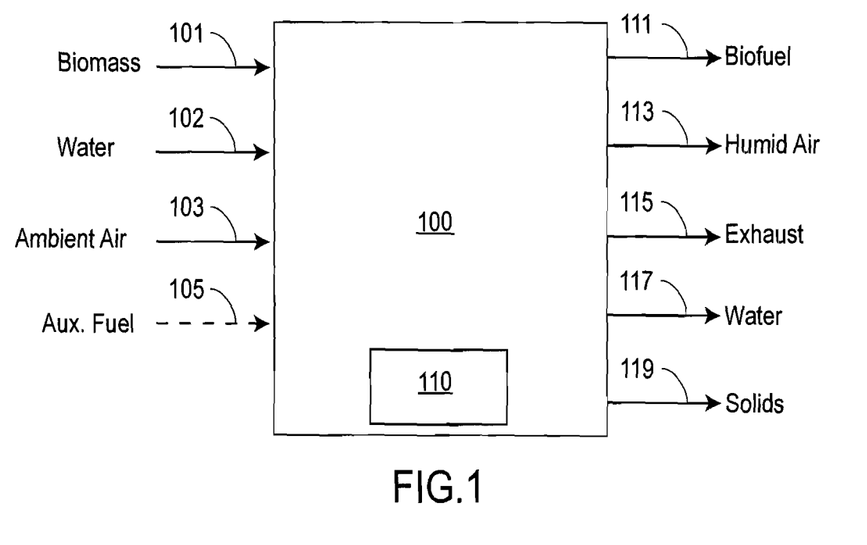
FIG. 1 is a general schematic of an apparatus for converting biomass to biofuel.

FIG. 1 is a general schematic of an apparatus 100 for converting biomass to biofuel. The term "biomass" is a general term that refers to living matter or formerly living matter. It may include, for example and without limitation, material specifically grown or gathered for conversion to biofuel, or waste products from the use or maintenance of plants. Examples of biomass include, but are not limited to, woody biomass, agricultural byproducts, and municipal green waste. A "biofuel" is a fuel composed of or produced from biological raw materials. One type of preferred biofuel is a solid that is compatible with existing power plants, allowing for the reduction or elimination of conventional hydrocarbon fuels. Such biofuels are coal-like, and are referred to herein as "biocoal." Other types of biofuels are gaseous, liquid, or some combination of gaseous, liquid, and/or solid biofuel. The term "torrefied biomass" as used herein refers to a biomass that is torrefied—that is, heated to drive off volatile components without significantly affecting the remaining material. Torrefaction of biomass is achieved at moderate temperatures, such as above approximately 200° C. and below approximately 350° C., for example and without limitation. The volatile gases thus driven off are sometimes referred to herein as "torrefaction gases," or "torr gases." In certain embodiments, the biomass is heated to a first temperature of approximately 100° C., driving off gases that are very volatile, including steam, and then is heated to a higher temperature, resulting in gases having more combustible components.

It is a general feature that apparatus 100 converts a biomass to a biofuel efficiently, both from an energy and cost perspective. In certain embodiments apparatus 100 is a system that includes physical and/or chemical processes to accept a biomass at an input 101 and produce a biofuel at an output 111. Certain embodiments of apparatus 100 may also include the generation of electrical power which is generally, but not necessarily exclusively, used within the apparatus.

Apparatus 100 may further include other inputs that accept other materials that may be used in the conversion of biomass to biofuel and other outputs that are used to reject products that are not included in the biofuel. Thus for example, and without limitation, apparatus 100 may have an input 102 for accepting water, an input 103 for accepting ambient air, and an output 113 for rejecting humid air, an output 115 for rejecting gases that are either inappropriate for, or not easily included in, the biofuel, or that contain excess heat from the apparatus, an output 117 that rejects water, and an output 119 that rejects solids that do not form part of the biofuel.

In certain other embodiments, an input 105 is provided for an auxiliary fuel. The auxiliary fuel, which may, for example be diesel fuel, propane, natural gas, methane, or some other liquid or gaseous fuel, is an optional input that may be used in the conversion of biomass to biofuel. The auxiliary fuel may thus be used to generate electric, thermal or mechanical energy. In certain embodiments, apparatus 100 operates as a self-sustained process, not requiring auxiliary fuel. In these embodiments, an auxiliary fuel may be used during the start-up of the process, either as needed energy to start the process or to allow components obtained therein to more quickly reach temperatures that allow for the efficient operation of the apparatus. In certain other embodiments, the auxiliary fuel may include, or be replaced by, an input of electrical power, or the fuel may be the biomass or a stored portion of the torrefied product, or gasified biomass. Alternatively, an auxiliary electric power source may be used for start-up or for stead-state operation under certain conditions.

In addition, apparatus 100 includes a control system 110, such as programmable computer, that collects information from sensors within the apparatus, which may include but are not limited to, contact or non-contact temperature sensors, pressure sensors, gas analyzers, chemical analyzers, solids analyzers, humidity sensors, liquid level sensors, solid level sensors, and flow sensors and/or controllers. Control system 110 may also provides signals to operate and/or control valves, motors, pumps, blowers and the like, within apparatus 100. Control system 110 may, for example and without limitation, control valves or flow rates to optimize the performance of apparatus 100 by, for example, ensuring that various components are operating at predetermined temperatures or pressure that allow catalysts, heat engines or heat exchanger to operate at certain conditions. Control system 110 may be physically included in apparatus 100, or may include wireless connections to computers or other electronic components that are physically removed from the apparatus.

Figure 2:
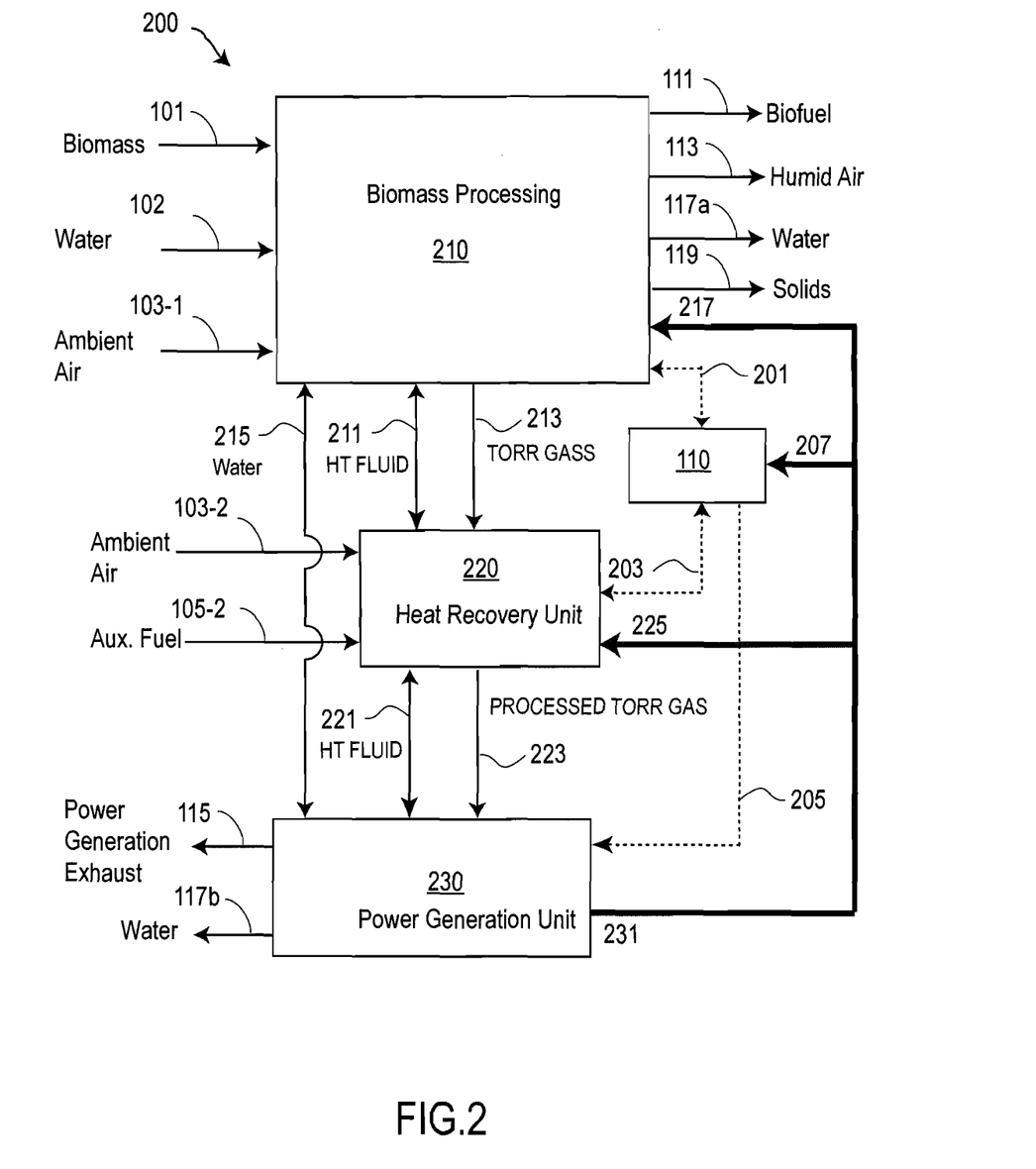
FIG. 2 is a first embodiment of a biomass-to-biofuel apparatus.

FIG. 2 is a first embodiment of a biomass-to-biofuel apparatus 200. Apparatus 200 may be generally similar to apparatus 100, except as further detailed below. Where possible, similar elements are identified with identical reference numerals in the depiction of the embodiments of FIGS. 1 and 2.

Apparatus 200 is shown as including a biomass processor 210, a heat recovery unit 220, and a power generator 230. The names given to biomass processor 210, heat recovery unit 220, and power generator 230 are not limiting—they are meant to aid in the discussion of apparatus 200 and are invocative of possible functions. Thus, for example, one or more of processor 210, heat recovery units 220, and/or power generator 230 may include gas processing and/or heat transfer elements.

As discussed subsequently in greater detail with respect to a specific embodiment, biomass processor 210 is generally configured to have a steady-state operating condition to a) accept biomass including, but not limited to, wood, plant residues, forest trimmings, or paper residue, b) dry the biomass; c) torrefy the biomass, and d) pelletize the torrefied biomass to form a biofuel. The gases evolved from torrefaction are provided to heat recovery unit 220, and then to power generator 230 to generate electricity that is used in biomass processor 210 and heat recovery unit 220, and by control system 110.

In one embodiment, biomass processor 210 accepts biomass at input 101, water at input 102, and ambient air at input 103-1, and provides biofuel at output 111, moist air at output 113, water at output 117, waste solids at output 119, and torrefaction gases at line 213. As discussed subsequently, biomass processor 210 also exchanges a heat transfer fluid 202 via lines 211 to heat recovery unit 220 and a heat transfer fluid 204 via lines 215 to power generator 230.

Alternatively, biomass processor 210 may also provide for the cleaning, washing, hydrating, and/or sizing of the biomass as appropriate for further processing.

In certain embodiments, apparatus 200 utilizes a heat transfer fluid 202 that boils in the temperature range torrefaction, such as from 200° C. to 350° C. Thus, for example, the heat transfer fluid may be mixture of biphenyl ($C_{12}H_{10}$), diphenyl oxide ($C_{12}H_{10}O$), poly-phenyls, and halogenated derivatives thereof. One such particularly useful heat transfer fluid is a mixture of biphenyl and diphenyl oxide ($C_{12}H_{10}O$) marketed as DOWTHERM™ A, (Dow Chemical Company, Midland, Mich.). DOWTHERM™ A has a boiling point of 257° C. at ambient pressure (0.1 MPa), increasing to a 355° C. at 0.58 MPa. Another heat transfer fluid 202 is a mixture of isomers of an alkylated aromatic. One such heat transfer fluid is DOWTHERM™ J, which is also manufactured by Dow Chemical Company.

This temperature range includes the temperature range of torrefaction of biomass. In the present invention, torrefaction occurs within a heat exchanger providing indirect heat transfer to boil such a heat transfer fluid, thus ensuring that the biomass temperature is controllable, via the heat transfer fluid pressure, and within the temperature range for torrefaction.

Heat recovery unit 220 accepts torrefaction gases from line 213, ambient air at input 103-2, and auxiliary fuel, when needed, at input 105-2. As discussed subsequently in certain embodiments, heat recovery unit 220 chemically reacts air from input 103-2 and torrefaction gases from line 213 to produce exhaust gases at line 223. The reaction of air and torrefaction gases is exothermic, with the heat provided to biomass processor 210 via an exchange of fluids through heat transfer lines 211 and to power generator 230 via fluid in heat transfer lines 221.

Power generator 230 accepts the processed torr gases from line 223 and produces an exhaust that is ejected at exhaust output 115. Water or other liquids may also condense from biomass processor 210 and be ejected at water output 117. Power generator 230 generates electricity which is provided, via line 231 to power input 225 of heat recovery unit 220, to control system 110 at power input 207, and to biomass processor 210 at power input 217.

Apparatus 200 includes sensors, motors, and valves that are in communication with control system 110. The sensors collect information, which may include, for example and without limitation, temperatures, pressures, material levels and flow rates, moisture content, and oxygen content. The control elements, which may include, for example and without limitation, valves, motors, pumps and blowers, may be actuated according to commands from control system 110 to enable apparatus 200 to produce biofuel from biomass. Control system 110 may collect data and/or provide control signals via lines 201, 203, and 205 to biomass processor 210, heat recovery unit 220, and power generator 230. Apparatus 200 may also include check valves and/or pressure relief valves that automatically operate to maintain pressures within the apparatus.

Figure 3A:
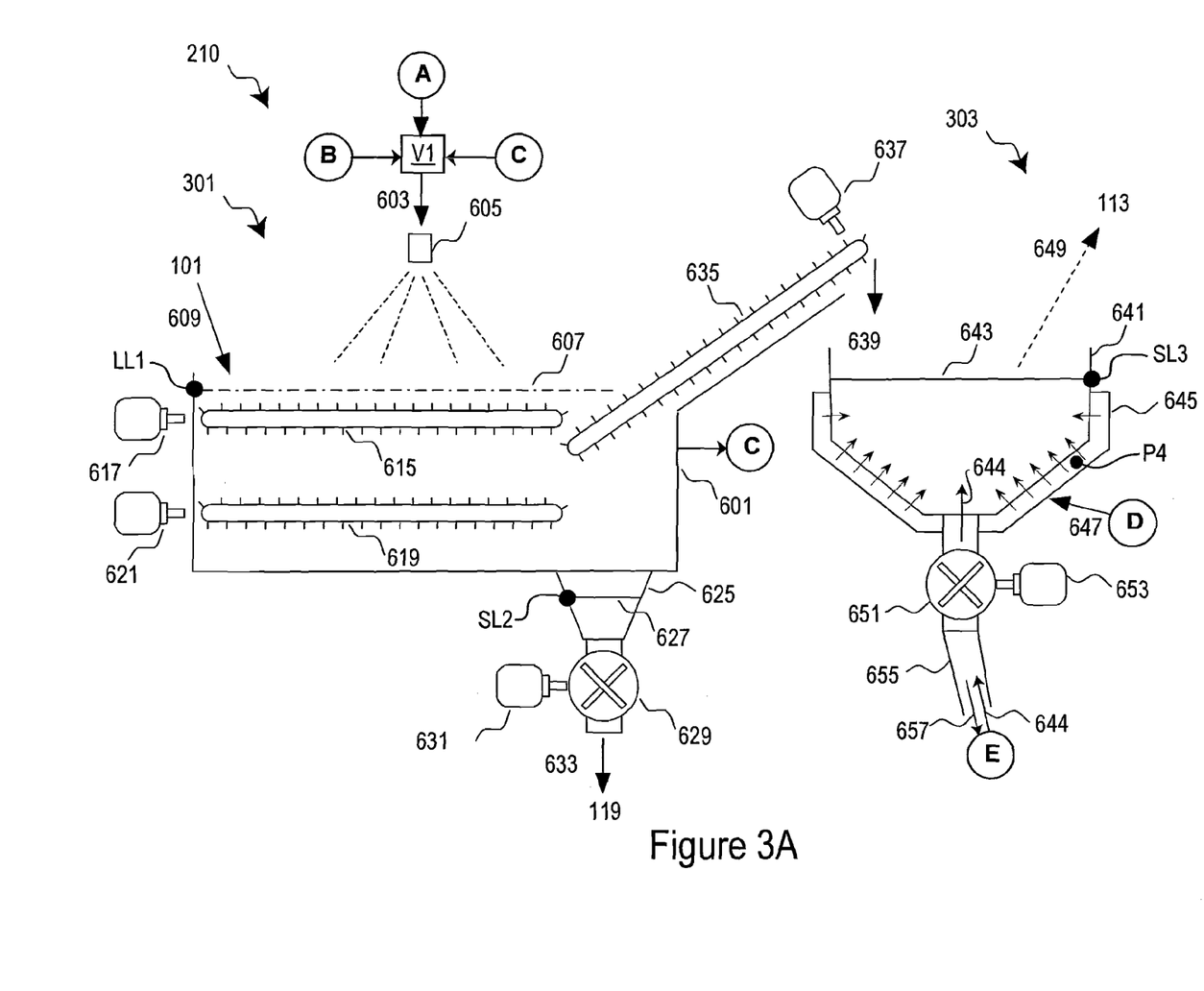
FIGS. 3A and 3B are schematics of a biomass processor of the embodiment of FIG. 2.
Figure 3B:
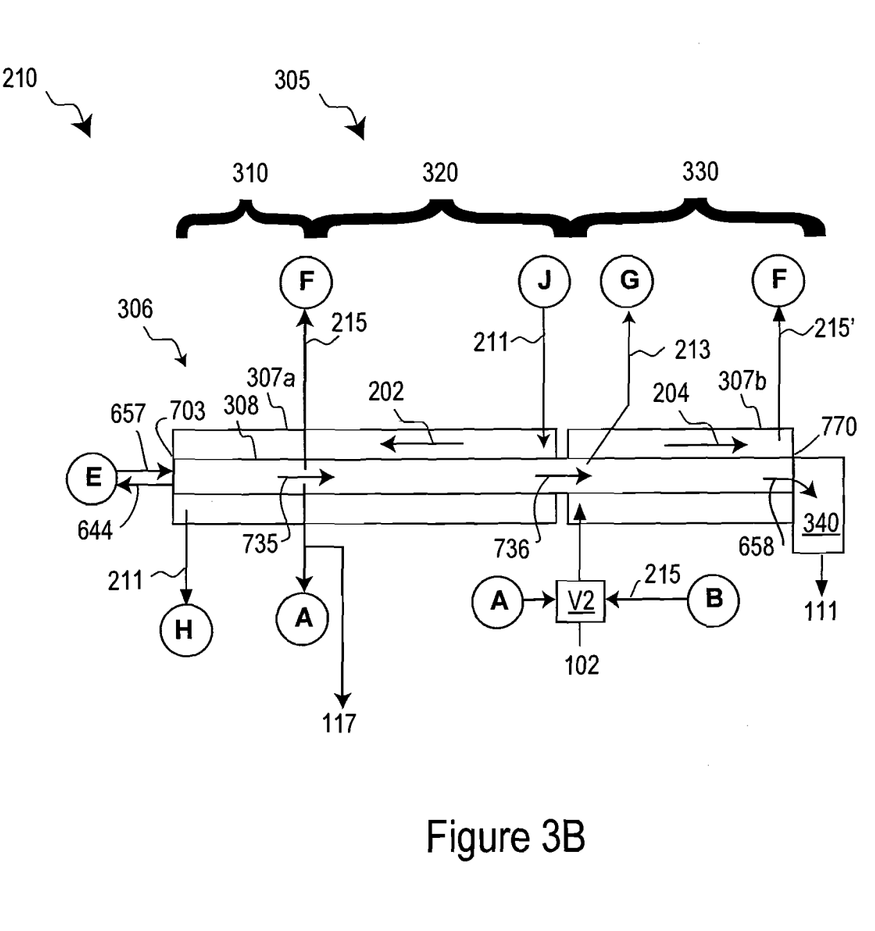
Figure 3C:
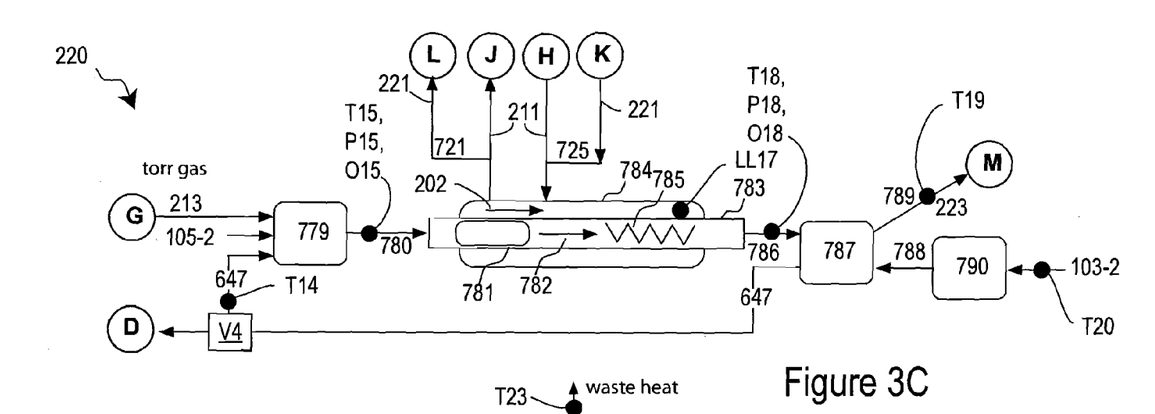
FIG. 3C is a schematic of a heat recovery unit of the embodiment of FIG. 2.
Figure 3D:
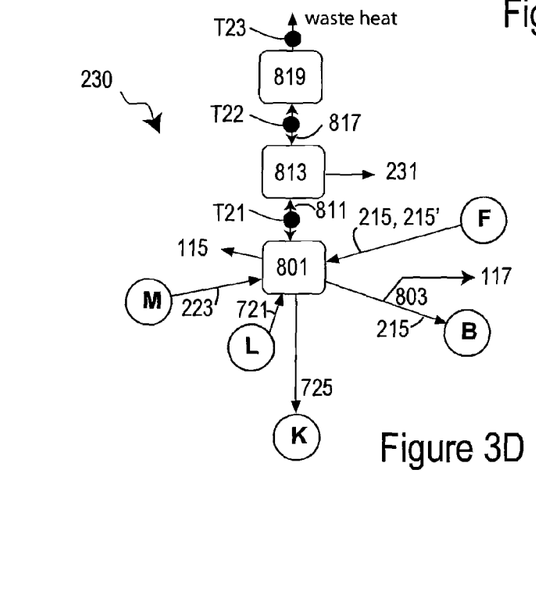
FIG. 3D is a schematic of a power generator of the embodiment of FIG. 2.

One embodiment of apparatus 200 is provided in FIGS. 3A, 3B, 3C, and 3D. Specifically, FIGS. 3A and 3B illustrate one embodiment of biomass processor 210, FIG. 3C illustrates one embodiment of heat recover unit 220, and FIG. 3D illustrates one embodiment of power generator 230. Apparatus 200 of FIGS. 3A, 3B, 3C, and 3D may be generally similar to the apparatus of FIGS. 1 and/or 2, except as further detailed below. Where possible, similar elements are identified with identical reference numerals in the depiction of the embodiments of FIGS. 1, 2, 3A, 3B, 3C, and 3D.

In the discussion that follows, it is understood that all sensors may provide signals to control system 110, and that apparatus control elements may obtain control signals from control system 110. It is understood that embodiments may have more or fewer sensors, and more or fewer control elements. In addition, there may be more than one control system, the one or more control systems may communicate or operate separately. Further, one or more sensors may provide information for information purposes and not affect the control of apparatus 200, and one or more process control elements may be under manual operation, or manual override of an automatic control system.

Biomass processor 210 includes a biomass preparation portion 301 (as shown in FIG. 3A) a biomass metering portion 303 (as shown in FIG. 3A), and a biomass thermal processing portion 305 (as shown in FIG. 3B).

As shown in FIG. 3A, biomass preparation portion 301 includes a biomass washing tank 601 that can accept an input biomass 609 from inlet 101, and water 603 from spray nozzle 605, according to the action of a water selection valve V1 and one or more pumps (not shown). Specifically, valve V1 may accept water from biomass preparation portion 301 at locations labeled "A" or "C," or from power generator 230 at the location labeled "B."

A liquid level sensor LL1 may determine the liquid level 607 in tank 601. Water may be recirculated by drawing liquid (at position "C") from near the top of tank 601 to valve V1 using a pump (not shown). The bottom of tank 601 includes a funnel 625 connected to output 119 through a load lock 629 operated by a motor 631. A solid level sensor SL2 may determine a solid level 627 in funnel 625. Liquid level sensor LL1 may be, for example and without limitation, a float switch.

In general, any of the load locks described herein may be rotary valves, such as star valves, or may be formed from pairs of pinch valves. Thus a rotary transfer lock may be, for example and without limitation, a PN#12rvccma1b000, manufactured by Rotolok Valves, Inc (Monroe N.C.). The pinch valves may be pneumatic RF Valves, type be4 p15-543s, manufactured by RF Valves, Inc (Columbia Md.).

Biomass preparation portion 301 also includes devices to move biomass through the portion. Thus, for example and without limitation, portion 301 is shown as having a first conveyor 615, a second conveyor 619, and a third conveyor 635 that are powered, respectively, by a motor 617, a motor 621, and a motor 637.

Biomass metering portion 303 includes a hopper 641 adjacent to third conveyor 635 for accepting washed biomass 639, and a load lock 651 operated by a motor 653 that provides washed biomass 657 to chute 655. The level of material in hopper 641 may be monitored by a solid level sensor SL3. Solid level sensor SL3 may be, for example and without limitation, an ultrasound or optical detector. Hopper 641 has a surrounding hot air plenum 645 that can accept hot air 647 from heat recovery unit 220 at "D," and inject the air into hopper 641, indicated by arrows, resulting in moist air 649 which may be provided to output 113. The pressure of plenum 645 may be monitored by a pressure sensor P4.

In certain embodiments, load lock 651 is air-tight. In certain other embodiments, load lock 651 permits gas to flow, even when no solids are being transferred through the lock. Thus, for example, FIG. 3A illustrates a flow of gas 644 back through chute 655, load lock 651, and into hopper 641. In yet other certain embodiments, load lock 651 may be located between conveyor 635 and hopper 641, effectively isolating the contents of the hopper 641 from air.

Alternatively, if the biomass is sufficiently clean, it may be provided directly into hopper 641 without going through biomass preparation portion 301.

Biomass processing portion 305 heats the biomass to dry and torrefy the biomass, and may optionally cool the torrefied biomass (the biofuel, or biocoal) to recover heat. As shown in FIG. 3B, biomass thermal processing portion 305 includes a heat exchanger 306. Heat exchanger 306 has a biomass transfer portion 308 that provides for transport of the biomass from an inlet 703 to an outlet 770. In addition, biomass transfer portion 308 may also provide for gases or liquids to be removed from contact with the biomass. Thus FIG. 3B shows extraction lines connected to locations "A," "F", and "G." As discussed subsequently, these lines may also include valves and, depending on the temperature and/or location in heat exchanger 306 may include liquid water, steam, or torrefaction gases.

In certain embodiments, the flow of biomass from inlet 703 to outlet 770 may reverse direction for short periods of time to agitate the biomass to facilitate heating, cooling, or aiding in providing a uniform biofuel mixture.

Heat exchanger 306 also includes one or more heat transfer fluid portions 307, illustrated without limitation as heat transfer fluid portions 307a and 307b, for providing indirect heat transfer between the biomass in biomass transfer portion 308 and a heat transfer fluid, which may be water/steam or a commercially obtainable heat transfer fluid, flowing through portion 307. Fluid in portions 307 may thus heats and/or cools the biomass at different locations in the heat exchanger by indirect contact with one or more heat transfer fluids.

In an illustrative example, FIG. 3B shows heat exchanger 306 as consisting of three heat exchanger portions: a biomass dryer 310, a biomass torrefier 320, and a biomass cooler 330. The names of heat exchanger portions 310, 320, and 330 are not limiting—they are meant to aid in the discussion of apparatus 200 and are invocative of possible functions. Thus, for example, biomass dryer 310 may not completely dry the biomass, or may at times partially torrefy the biomass. Biomass dryer 310 and biomass torrefier 320 are shown as corresponding to heat transfer fluid portion 307a, which accepts a heat transfer fluid from location "J" and provides the fluid to location "H." Biomass cooler 330 is shown as corresponding to heat transfer fluid portion 307a, accepting water from location "A," "B," or inlet 102 and providing steam at location "F."

Heat exchanger 306 collects washed biomass 657 in inlet 703 from the location labeled "E" in FIG. 3A. Heat transfer fluids are provided to heat the biomass and biomass derived material within heat exchanger sections 310 and 320, and to cool the biomass derived material within biomass cooler 330. In biomass dryer 310, the biomass is heated to remove a substantial amount of the water and any of the more volatile gases, and is provided as a dried biomass 735 to biomass torrefier 320. In biomass torrefier 320, the biomass is further heated to form torrefied biomass 736, and to collect the remaining volatile gases. In cooling biomass cooler 330, heat is recovered from the torrefied biomass. Cooled, torrefied biomass 658 is delivered from outlet 770 is then provided to biomass compression portion 340, which provides the biomass as a biocoal product to output 111.

More specifically, heat exchanger 306 is shown illustratively as comprising a biomass transport portion 308 and one or more heat transfer fluid portions 307a and 307b. Biomass transport portion 308 accepts washed biomass 657 and moves the biomass material sequentially through biomass dryer 310, biomass torrefier 320, and cooling biomass cooler 330, while providing heat transfer fluids to maintain the reactors or heat exchangers at specified or controlled temperatures. Torrefied biomass 658 is provided at outlet 770 into a biomass compression portion 340. Biomass dryer 310, biomass torrefier 320, and cooling biomass cooler 330 thus includes one transport device or several transport devices in serial or parallel to move biomass through each heat exchanger portion 310, 320, and 330. Biomass transport portion 308 may include, but is not limited to, augers, rotary kilns, vibratory devices, or conveyors.

Heat exchanger portions 310 and 320 correspond to heat transfer fluid portion 307a, which accepts a heat transfer fluid 202 from the location labeled "J" in heat recover unit 220, provides a flow of the heat transfer fluid along those parts of biomass transport portion 308 associated with heat exchanger portions 310 and 320, and provides the heat transfer fluid to the location labeled "H" in heat recovery unit 220.

Water from the biomass in biomass dryer 310 is collected at the location labeled "A," or may be discharged through output 117. Steam from the biomass in biomass dryer 310 is collected in line 215 and provided to the location labeled "F," which is provided to the power generator 230.

Biomass cooler 330 corresponds to heat transfer fluid portion 307b, in which a heat transfer fluid 204 is water. Liquid water may be provided input 102 and/or the locations labeled as "A" or "B" in from apparatus 200 and as selected by a valve V2. After cooling the biomass, the water may be removed as steam is collected in line 215 and provided to the location labeled "F," which is provided to the power generator 230.

Torrefaction gases are collected from the biomass in biomass torrefier 320 and provided in line 213 to the location labeled "G" in heat recovery unit 220.

In certain embodiments, the biomass is processed to remove water from the biomass in biomass dryer 310 without evolving a substantial amount of combustible volatile compounds. The biomass is further processed in biomass torrefier 320 to collect combustible torrefaction gases at "G," which will then be reacted in heat recovery unit 220. In general, the volume and composition of the torrefaction gas is a function of the solid transit time through the biomass torrefier 320 and the temperature of heat transfer fluid 202. Bound oxygen is driven off (reduced) from the biomass in biomass torrefier 320 producing torrefaction gases composed of $CO_2$, $H_2O$ and $C_xH_yO_z$ volatiles. As the temperature of biomass torrefier 320 increases, or the transit time increases, more of the solids are converted to gases, thus decreasing the mass, and energy content, of the solids and increasing the mass of, and the energy content of the gases. In one embodiment, the carbon conversion ratio of the process may be a control mechanism which allows the apparatus to operate under conditions of varying biomass input characteristics. Thus by adjusting the parameters of the biomass processing (that is, the torrefaction auger speed and temperature), the fuel value of the torrefaction gases are likewise adjusted such that the fuel requirements of power generator 230 can be met.

In one embodiment, heat exchanger portions 310 and 320 are operated at the same temperature, and the feed rates of biomass is adjusted so that dried biomass 735 contains some amount of water, such as less than 15% by weight. In one embodiment, fluid 202 is provided to heat exchanger portions 310 and 320 in the temperature range of 200° C. to 350° C.

Figure 4:
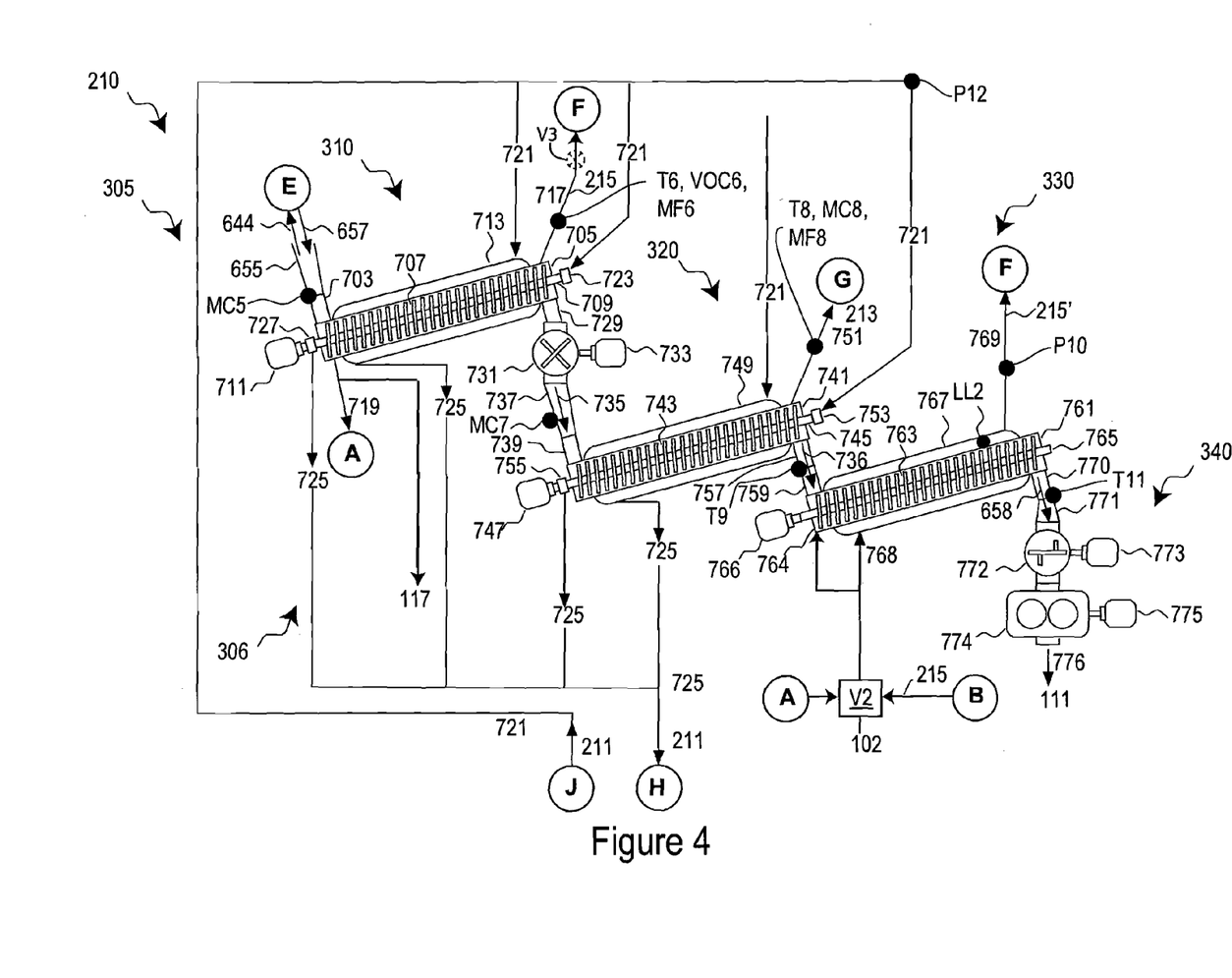
FIG. 4 is a schematic of an alternative biomass processor.

FIG. 4 is a second embodiment biomass thermal processing portion 305 and biomass compression portion 340, which are generally similar to the embodiment of FIG. 3B. FIG. 4 also shows the placement of sensors, which are particular to the specific heat exchangers.

In the embodiment of FIG. 4, biomass dryer 310, biomass torrefier 320, and biomass cooler 330 include augers that permit indirect contact of the biomass with heat transfer surfaces. Biomass dryer 310 collects biomass material from the location labeled "E" in biomass dryer 310 in inlet 703, and may include a moisture content sensor MC5 to determine the moisture content of material 657. Biomass dryer 310 moves the material to an outlet 729 by rotating auger blades 707 that are located within an auger housing 705. Blades 707 are mounted on a hollow auger shaft 709 controlled by a motor 711. Rotary couplings 727 and 723 are provided near inlet 703 and outlet 729, respectively, to allow a heat transfer fluid to flow through the center of hollow auger shaft 709. An auger housing jacket 713 extends along housing 705 to allow a heat transfer fluid to flow on the outside of the housing.

The output 729 of biomass dryer 310 is provided to a load lock 731 controlled by a motor 733 and provides dried biomass 735 through chute 737 to an input 739 of biomass torrefier 320. The moisture content of dried biomass 735 may be monitored in chute 737 with moisture content sensor MC7. Biomass torrefier 320 provides the torrefied biomass to an outlet 757 with auger blades 743 that are located within an auger housing 741. Blades 743 are mounted on a hollow auger shaft 745 controlled by a motor 747. Rotary couplings 755 and 753 are provided near inlet 739 and outlet 757, respectively, to allow a heat transfer fluid to flow through the center of hollow auger shaft 745. An auger housing jacket 749 extends along housing 741 to allow a heat transfer fluid to flow on the outside of the housing.

The output 757 of biomass torrefier 320 includes a temperature sensor T9 that may measure the temperature of biomass 736 from the biomass torrefier. The biomass 736 is provided to an inlet 759 of cooling biomass cooler 330, which transports the material to an outlet 770 with auger blades 763 that are located within an auger housing 761. Blades 763 are mounted on an auger shaft 765 controlled by a motor 766. A housing inlet 764 is provided near inlet 736 to allow a heat transfer fluid to mix with biomass 736. An auger housing jacket 767 extends along housing 761 to allow a heat transfer fluid to flow on the outside of the housing.

The cooled, torrified biomass material from outlet 770 is then provided to a chute 771, where a temperature sensor T11 may measure the biomass temperature. Chute 771 is an input for a grinder 772 that is operated by a motor 773, and then to a briquetter 774 operated by a motor 775, which provides the biomass as a biocoal product 776 to output 111. Grinders and briquetters are well known in the field of wood pelletization for fuel production.

Auger housings 705, 741, and 761 correspond to biomass transfer portion 308. The center of hollow auger shafts 709 and 745, and auger housing jackets 713 and 749 correspond to heat transfer fluid portion 307a, and auger housing jacket 767 corresponds to heat transfer fluid portion 307b.

Heat transfer fluids are provided to heat the biomass and biomass derived material within heat exchanger portions 310 and 320, and to cool the biomass derived material within biomass cooler 330. In heat exchanger portions 310 and 320, a heat transfer line 721 provides fluid, whose pressure may be monitored by a pressure sensor P12, and which is obtained from the location labeled "J" the heat recovery unit 220. Heat transfer line 721 provides the fluid to auger jacket housing 713 (which is the exterior of biomass dryer 310), rotary coupling 723 (which provides flow into the interior of the biomass dryer), auger jacket 749 (which is the exterior of biomass torrefier 320), and rotary coupling 753 (which provides flow to the interior of the biomass torrefier). Heat transfer fluid is recovered in line 725 from auger jacket housing 713, rotary coupling 727, auger jacket 749, and rotary coupling 755.

Water from the drying biomass is collected at auger output 719, and may be provided back to valve V1 (as indicated by the label "A"), or may be discharged through output 117. Steam from the dried biomass is collected in line 717, where the temperature may be measured by temperature sensor T7, the non-water components are measured with a volatile organic compound (VOC) sensor VOC6, and mass flow may be measured by mass flow sensor MF6.

Liquid water is used as a heat transfer fluid to cool biomass in cooling biomass cooler 330. Liquid water 768 may be provided to auger housing jacket 767 and inlet 764, where the water may be provided from input 102 and/or the locations labeled as "A" or "B" in biomass processor 210 and power generator 230, as selected by a valve V2. After cooling the biomass, the water may be removed as steam 769, where the pressure may be measured by pressure sensor P10. Liquid level sensor LL2 is used to ensure that the auger is filled with water to maintain the temperature of cooling biomass cooler 330.

As shown in FIG. 3C, heat recovery unit 220 includes a combustion mixer 779, a pressure vessel 784 that contains a catalytic combustor 781, a heat transfer augmenter 785, and a heat transfer tube 783, a recuperator 787, a blower 790, and valve V4.

Biomass gases obtained from biomass torrefier 320 at "G," and hot air 647, obtained from recuperator 787 via valve V4 are mixed in combustion mixer 779. In addition, auxiliary fuel may be provided to mixer 779 via input 105-2.

The output of combustion mixer 779 is a combustible gas mixture 780 whose temperature, pressure, and oxygen content may be measured by temperature sensor T15, pressure sensor P15, and oxygen sensor O15, respectively. The mixture is then provided to catalytic combustor 781, and combusted gases 782 flow through heat transfer augmenter and a heat exchange tube 783, where the gases exit as medium temperature exhaust gases 786. The temperature, pressure, and oxygen content may be measured by temperature sensor T18, pressure sensor P18, and oxygen sensor O18, respectively, before entering recuperator 787.

Heat transfer fluid 202 from liquid heat transfer fluid from line 725 in biomass dryer 310 is provided to catalytic combustor 781, and heat transfer tube 783, to raise the temperature of the heat transfer fluid and return it as a vapor to line 721

("J" in heat recovery unit 220). A liquid level sensor LL17 may measure the level of the heat transfer fluid 202 in heat recovery unit 220. Liquid heat transfer fluid is also obtained from power generator 230 (at "K"), and vapor heat transfer fluid may also be provided to the power generation unit (at "L").

Auxiliary air from inlet 103-2, and whose temperature may be measured with temperature sensor T20, is provided, via blower 790, as pressurized air 788. Heat from gases 786 are provided to pressurized air 788 to form hot air 647, which is then provided to valve V4. Cooled combusted gases 789, whose temperature may be measured with a temperature sensor T19, leave heat recovery unit 220 in line 223.

The augers of heat exchanger portions 310, 320, and 330 of FIG. 4 are preferably sized to transport and provide sufficient heating for the biomass passing there through. Thus auger may be, for example and without limitation, of the type manufactured by Augers Unlimited (Coatsville, Pa.) fabricated of stainless steel. Thus, for example and without limitation, a throughput of 500 kg/hr may require that auger has a diameter of 12 inches (0.3 m) to 24 inches (0.6 m), a length of 10 feet (3 m) to 30 feet (10 m), and capable of operating an external pressure of 4 bars (0.4 MPa) absolute.

As shown in FIG. 3D, power generator 230 includes a heat receiver 801, a heat engine 813, a waste heat rejection system 819, a closed water loop 811 between the heat receiver and heat engine, and a closed water loop 817 between heat engine and heat rejection system. Power generator 230 utilizes the exhaust gases to generate power, as for example and without limitation, in a Rankine cycle engine, such as an organic Rankine cycle (OCR) engine model UTC 2800, manufactured by UTC Power (United Technologies Corporation, South Windsor, Conn.), or a turbine. In heat receiver 801, heat from exhaust gas 789 is accepted from "M" from heat recovery unit 220 and rejected as a colder exhaust 115, heat from vapor heat transfer fluid 721 is accepted from heat recovery unit 220 at "L" and provided back to heat recovery unit 220 at "K," and heat from steam 717 and 769 from two locations labeled "F" in FIG. 3B, and is returned as liquid water 803, to wash the biomass ("B" in biomass processing unit 210) or to output 117. In an alternative embodiment, heat receiver 801 includes a boiler to provide pre heat the steam 717 or 769 as it enters the receiver. In yet another alternative embodiment, heat from steam is obtained from only one of either steam 717 or steam 769. Closed water loop 811 transfers the heat from heat receiver 801 to heat engine 813, which generate electric power provided to line 231. Closed water loop 817 transfers heat through waste heat rejection system 819 to the environment.

The temperature of water in loops 811 and 817 may be measured with temperature sensors T21 and T22, respectively.

The measurement of temperature, pressure, gas composition, humidity, liquid and solid levels, and flow rates are well known in the field, and may include, but are not limited to, contact and non-contact measurements, optical measurements (i.e. Omega OS100E infrared thermometer to measure temperature or a NIR optical analyzer to determine gas composition), and may include measurements nearby the intended material to be measured, such as measuring a liquid temperature by measuring the wall temperature of a liquid container. The sensors noted herein are well known in the field.

Operation of the Apparatus

The material flow rates and temperature of the components of system 200 are preferably operated to: 1) minimize the amount of volatile components (with the exception of water) recovered from biomass dryer 310; 2) minimize the amount of water recovered from biomass torrefier 320; and 3) generate enough electric power in the power generation unit to operate the system.

Minimizing volatile components recovered from biomass dryer 310 and minimizing the amount of water recovered from biomass torrefier 320 may be accomplished in a number of ways. Thus, for example and without limitation, load locks positioned at different stages in system 200 may isolate the drying, torrefaction, and cooling portion from the biomass inlet and biofuel outlet. Gases extracted from these stages may thus be substantially partitioned between steam and torr gases. Additionally, or in place of the load locks, steam and torr gas extraction locations may include valves to control the exit of steam and torr gas from system 200.

Thus for example, steam generated by the biomass in transport portion 703 prevents torr gas from flowing upstream from torrefier 320, and providing the torr gas to line 213. In addition, the steam thus generated may flow further upstream, essentially purging air from the biomass, and providing a "self-purging" system. Further, water added to biomass cooler 330 may also generate steam, further isolating the torr gases to torrefier 320 for extraction at line 213.

As an example of the operation of apparatus 200 of FIGS. 3A, 3B (or 4), 3C and 4D, raw biomass may be loaded into input 101 of biomass preparation portion 301, and provided to tank 601. Preferably, the biomass is provided at a nearly constant rate. A spray of water is provided through nozzle 605, where the water is either obtained from biomass dryer 310 ("A"), power generator 230 ("B"), or by recirculation from tank 601 ("C") according to the selection of valve V1, where the water is provided to maintain a constant level as indicated by sensor LL1.

As solid material settles in tank 601, sensor SL2 indicates when motor 631 needs to be operated to discharge the solids to output 119.

Motors 617, 621, 631, and 637 and valve V1 are thus operated by control system 110 utilizing the output of sensors LL1 and SL2 to provide the correct water level, to move biomass and solids through tank 601, and to provide biomass into biomass metering portion 303.

In biomass metering portion 303 the biomass is partially dried using a stream of hot air provided to hopper 641. In the embodiment of FIG. 3A, the pressure of hot air is monitored by sensor P4, and is controlled by blower 790 and valve V4, which directs hot air into hopper 641. If the pressure at sensor P4 is insufficient to flow through the biomass, then valve V4 may direct more flow towards hopper 641, and/or the blower may be operated to provide a higher pressure.

In general, the moisture content of biomass 657 varies with feedstock location, age and weather. System 200 may be controlled to accommodate these changes.

Since the torrefaction of biomass is best done in the absence of oxygen, biomass 657 leaves biomass metering portion 303 through lock 651 operated to prevent air from entering heat exchanger portions 310 and 320. Thus, for example, the biomass within heat exchanger portions 310, 320, and 330 may be at an elevated pressure, such as from 0.11 MPa absolute to 0.3 MPa absolute. Water evolving from biomass dryer 310 and torrefaction gases evolving from biomass torrefier 320 will pressurize the heat exchangers. Load locks at the ends of heat exchanger portions 310, 320, and/or 330, coupled with valves on outgas lines from the heat exchanger, will permit the separation of the various gases.

In one embodiment, steam 644 that leaves the drying biomass flows back into hopper 641, purging any air contained in the biomass before it leaves the hopper.

In certain embodiments, heat exchanger portions 310 and 320 are operated to obtain torrefaction gases, which are then used to generate electricity for operating system 200. It is thus important that the quality and quantity of torrefaction gas obtain from biomass torrefier have sufficient chemical energy. In one embodiment, heat exchanger portions 310 and 320 are operated at the same temperature, as provided by the saturation temperature of the heat transfer fluid in lines 721 and 725 at the pressure measured at sensor P12. This fluid is provided to both the inside and outside of heat exchanger portions 310 and 320, and may be at a temperature of between 200° C. and 350° C. The temperature of fluid provided to heat exchanger portions 310 and 320 may thus, for example, be approximately 200° C., approximately 225° C., approximately 250° C., approximately 275° C., or approximately 300° C., or approximately 325° C., or approximately 350° C.

Thus, for example, if there is some amount of moisture in the biomass as it leaves biomass dryer 310, one may be assured that evaporation of liquids less volatile than water has not occurred within the biomass dryer. An initial drying of the biomass takes place in dryer 310 through the phase change fluid of heat transfer fluid 202 at a constant temperature, for instance 300C. Biomass 657 with a moisture content of up to 60% on a wet basis leaves dryer 310 as biomass 735, with a moisture content of 10% to 20% on a wet basis. The moisture leaves as steam 717 or liquid water 719.

The biomass within dryer 310 may be, for example and without limitation, near at ambient pressure, with the steam nearly saturated at 100 C. In one embodiment, the output of sensor MC7 is monitored, and the speed of motor 711, and thus the flow of biomass through the biomass dryer, is adjusted to maintain a moisture content of from 10% to 25%. from 15% to 20%, or to be approximately 10%, 15%, 20% or 25%. If the moisture content is too high, then control system 110 may slow down motor 711 to provide more drying, while if the moisture content is too low, then control system 110 may speed up motor 711 to provide less drying.

In certain embodiments, electric power from power generation unit 230 may be maximized or controlled by adding water directly to the biomass in the dryer 310 (not shown) or by washing the biomass in the biomass preparation portion 301 to provide a steady supply of steam 717, to hydrate the biomass to operate the dryer at a high effective moisture content, for example 50% moisture content on a wet basis. It may also be desirable to move biomass 657 through dryer 310 at a rate where biomass 735 has a constant moisture content, as determined by MC7 of, for example and without limitation, of 10% to 20%. This control provides for a more uniform feed to torrefier 320, and prevents steam 717 from becoming superheated. An additional benefit is that less torrefaction will occur in dryer 310. A small flow of steam from dryer 310 into torrefier 320 can also serve to limit the backward flow of torr gases from the torrefier to the dryer.

In addition to the control of biomass through system 200, control system 110 may operate heat recovery unit 220 to change the pressure in line 721, and thus the temperature of heat exchanger portions 310 and 320.

Control system 110 may also control the speed of motors 653, 747, 766, 773, and/or 775 to match the flow rate of biomass through the other components and prevent the build up or total removal of biomass in the various components.

The time that the biomass is in biomass torrefier 320 may be, for example and without limitation, between approximately 5 minutes and approximately 60 minutes. The time may be, for example, approximately 5 minutes, approximately 10 minutes, approximately 15 minutes, approximately 20 minutes, approximately 25 minutes, approximately 30 minutes, approximately 35 minutes, approximately 40 minutes, approximately 45 minutes, approximately 50 minutes, approximately 55 minutes, or approximately 60 minutes. In another embodiment, the time is controllable between a minimum time and a maximum time, where the minimum time is any one of the following approximate times: 5, 10, 15, 20, 25, 30, 35, 40, 45, 50, or 55 minutes and the maximum time is any one of the following approximate times: 10, 15, 20, 25, 30, 35, 40, 45, 50, 55, or 60 minutes. In other embodiments, the time may be less than 5 minutes or greater than 60 minutes.

The material evolved from the biomass in biomass dryer 310 is primarily water, which exits the biomass dryer as liquid water 719 and as steam 717. The liquid water 719 may be provides at "A" to wash the incoming biomass, or provided to output 117. The steam is provided to power generator 230, where energy is extracted for power generation. The condensed water may then be returned at "B" to wash the incoming biomass, or provided to output 117.

The material evolved from the biomass in biomass torrefier 320 is a torrefaction gas 751, which is provided to heat recover unit 220 for recovery of the heat of combustion of the torrefaction gases.

Next, the torrefied biomass in cooled in biomass cooler 330. The outside of cooling biomass cooler 330 is provided with liquid water selected by valve V2 as coming from biomass evolved water from biomass dryer 310 (at "A"), from power generator 230 (at "B") or from water input 102. Liquid level LL2 is used to sense the water level and operate water pumps to ensure that the heat exchanger is filled, or nearly filled, with liquid water. The cooling water leaves biomass cooler 330 as steam, which is provided, along with steam 717 from biomass dryer 310, to power generator 230. Biomass cooler 330 is maintained at a temperature of 120° C. to 200° C.

Liquid water is also provided at inlet 764 into the biomass portion of cooling biomass cooler 330. This water evaporates when contacting the biomass in biomass cooler 330. The flow of water at inlet 764 is provided to prevent or greatly inhibit torrefaction gases from flowing out of biomass torrefier 320, and thus facilitate the removal of torrefaction gases in line 213.

The biofuel leaving cooling biomass cooler 330 is then ground, in grinder 772, and compressed in briquetter 774 to produce biocoal at output 111. Briquetter 774 preferably acts as a load lock, preventing or reducing the flow of gases from biomass cooler 330. Optionally, an additional load lock may be provided at or near biomass compression portion 340.

Heat recovery unit 220 pressurizes ambient air in blower 790, heats it in recuperator 787, and then, according to the operation of valve V4 mixes the heated air with torr gases 751 and, alternatively, with auxiliary fuel from input 105-2. The resulting combustible mixture 780 is then reacted in catalytic combustor 781, which includes heat transfer augmenter 785 and heat transfer tube 783 for heating the heat transfer fluid (from "K" and "H," and supplied to "J" and "L"). The output of the combustor is provided to recuperator 787 for preheating the air, and then to power generator 230 for electric energy production. The heat recovered from the torr gas can is divided between the biomass processor 210 and power generator 230.

In certain embodiments, it is desired to maintain catalytic combustion at some optimal temperature, for example and without limitation, from between 250° C. and 800° C. Thus, for example, higher temperatures may cause the catalyst to deactivate and possible structurally collapse and a lower temperature will be unable to initiate or support combustion.

Additionally, high temperatures will tend to degrade the phase change fluid. Thus, it may be of advantage to provide a means to moderate the temperature of the catalytic reaction.

In certain embodiments, combustible gas mixture 780 is run lean—and may have, for example a stoichiometry of 0.50. In addition to the previously mentioned advantages, running combustor 781 lean provides for complete combustion of the torrefaction gases and keeps the temperature of the combustor low, and prevents fouling of the system due to incomplete combustion of the volatiles.

Power generator 230 recovers heat from steam generated in biomass dryer 310 and heat recovered in the heat transfer fluid in heat recovery unit 220 into output of the combusted torr gases 789, uses the recovered energy to operate a heat engine to generate electricity at power output 231, and then discharge the exhaust at output 115.

In another embodiment, an optional pressure regulator V3 is provided between steam obtained from drying the biomass in dryer 310 and the power generation unit 230. Pressure regulator V3, which provides saturated steam at elevated pressure, such as 0.1 MPa and 120° C.

System Simulation

An analysis was performed to analyze how various parameters (such as feedstock moisture content) affect the overall heat and mass balances. These calculations were conducted for the nominally 1 ton/hr (1,000 kg/hr) device, utilizing the apparatus of FIGS. 3A, 4, 3C and 3D, where Table 1 lists the input parameters.

TABLE 1

Input parameters for mass and energy balances - 1 ton/hour (1,000 kg/hr) scale.

| Parameter | Value |
|---|---|
| Feedstock feed rate | 2.8 tons/hr |
| | (2,500 kg/hr) |
| Feedstock moisture mass fraction, wet basis (at 609) | 50% |
| Moisture mass fraction of partially dried wood 735 entering torrefier | 0%-60% |
| Heat of combustion of dry feedstock | 20 MJ/kg |
| Heat of combustion of torrefied wood | 25 MJ/kg |
| Yield of torrefied wood - dry wood basis | 68% |
| Air specific heat capacity | 1 kJ/kg-K |
| Air/fuel mass ratio in combustor (at 780) | 3.29 |
| Wood specific heat capacity | 1.5 kJ/kg-K |
| Liquid water specific heat capacity | 4.2 kJ/kg-K |
| Torrefied wood specific heat capacity | 1.5 kJ/kg-K |
| Water heat of vaporization | 2260 kJ/kg |
| Steam specific heat capacity | 1.9 kJ/kg-K |
| Heat of torrefaction | 0 kJ/kg |
| Exhaust gas specific heat capacity | 1.5 kJ/kg-K |
| ORC efficiency | 10% |

The moisture content (MC %) is a very significant feedstock variable. Using experimental measurements, discussed subsequently, the analysis provided a calibrated model for estimating system performance. Specifically, Table 2 shows the effect of moisture content on the operation of the system. The first column is the moisture content of the biomass being provided to the biomass dryer, on a percent wet basis. The second column is the amount of time spent in biomass dryer 310 at a temperature of 300° C., the third column is the amount of time spent in biomass torrefier 320 at a temperature of 300° C., the fourth column is the sum of the time spent in heat exchanger portions 310 and 320, the fifth column is the amount of water evolved, per ton of wet biomass, and the sixth column is the amount of wet biomass processed, per day.

TABLE 2

The effect of moisture content on the operation of the system

| % MC Wet Basis | Dry Time sec | Torr Time sec | Total Time sec | Mass Water ton/ton (kg/kg) | ton/day (kg/day) |
|---|---|---|---|---|---|
| 0% | 0.0 | 12.6 | 12.6 | 0.00 | 30.10 (27310) |
| 10% | 2.5 | 12.5 | 15.0 | 0.11 | 25.28 (22930) |
| 20% | 5.6 | 12.6 | 18.2 | 0.25 | 20.81 (18880) |
| 30% | 9.6 | 12.6 | 22.2 | 0.43 | 17.05 (15470) |
| 40% | 15.0 | 12.6 | 27.6 | 0.67 | 13.74 (12460) |
| 50% | 22.5 | 12.6 | 35.1 | 1.00 | 10.80 (9797) |
| 60% | 33.8 | 12.6 | 46.4 | 1.50 | 8.18 (7420) |

This analysis illustrates that system 200 may be controlled to provide torrefied biomass for a very wide range of biomass moisture content.

The torrefaction chemistry and heat exchanger design are preferably operated at an autothermal point, where the chemical energy in the torr gases is just sufficient to support production. For example, a 40% MC feedstock, with 20 MJ/kg Higher Heating Value (HHV), can produce at 35% yield a torr gas with 11 MJ/kg and a solid product at 65% yield of 25 MJ/kg, and be self sustaining, including system heat losses. The system output may be for instance 1 ton per hour, with an electrical load of 50 kW.

As another example, a 30% MC feedstock, with 20 MJ/kg HHV, can produce at 25% yield a torr gas with 11 MJ/kg and a solid product at 75% yield of 23 MJ/kg. The system output in this case would be 1.5 tons per hour (1400 kg/hr), and the electrical load of 75 kW. In this case less energy is required for drying and the system runs more quickly and uses the excess energy to produce power.

The simulation indicates that the torrefaction gases in line 213 include combustible gases including acetic acid, lactic acid, furfural, formic acid, hydroxyl acetone, methanol, carbon monoxide, and non-combustible gases including water and carbon dioxide.

Figure 5:
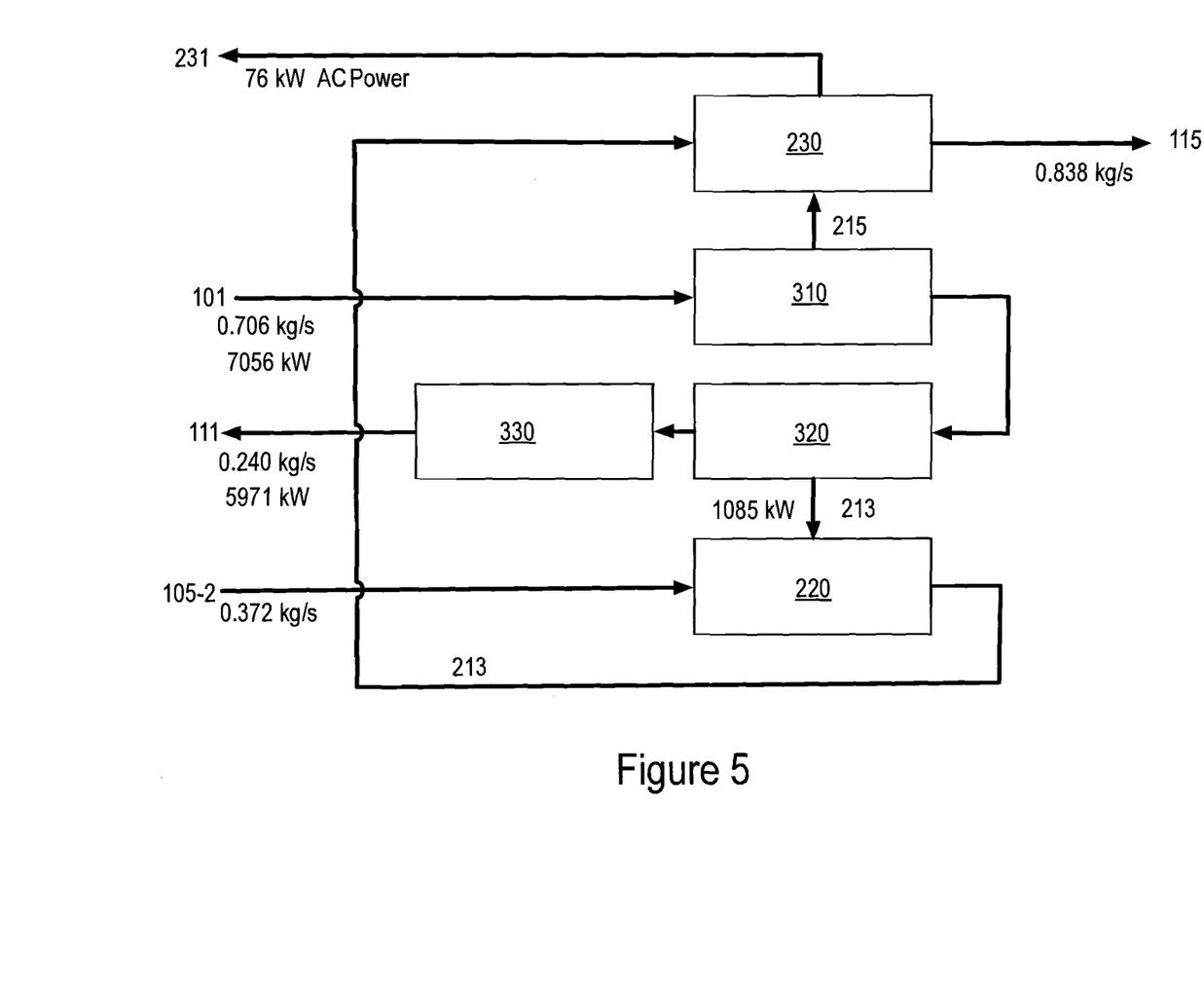
FIG. 5 shows the flow of mass and chemical energy at various points in the system of FIG. 2.
Figure 6:
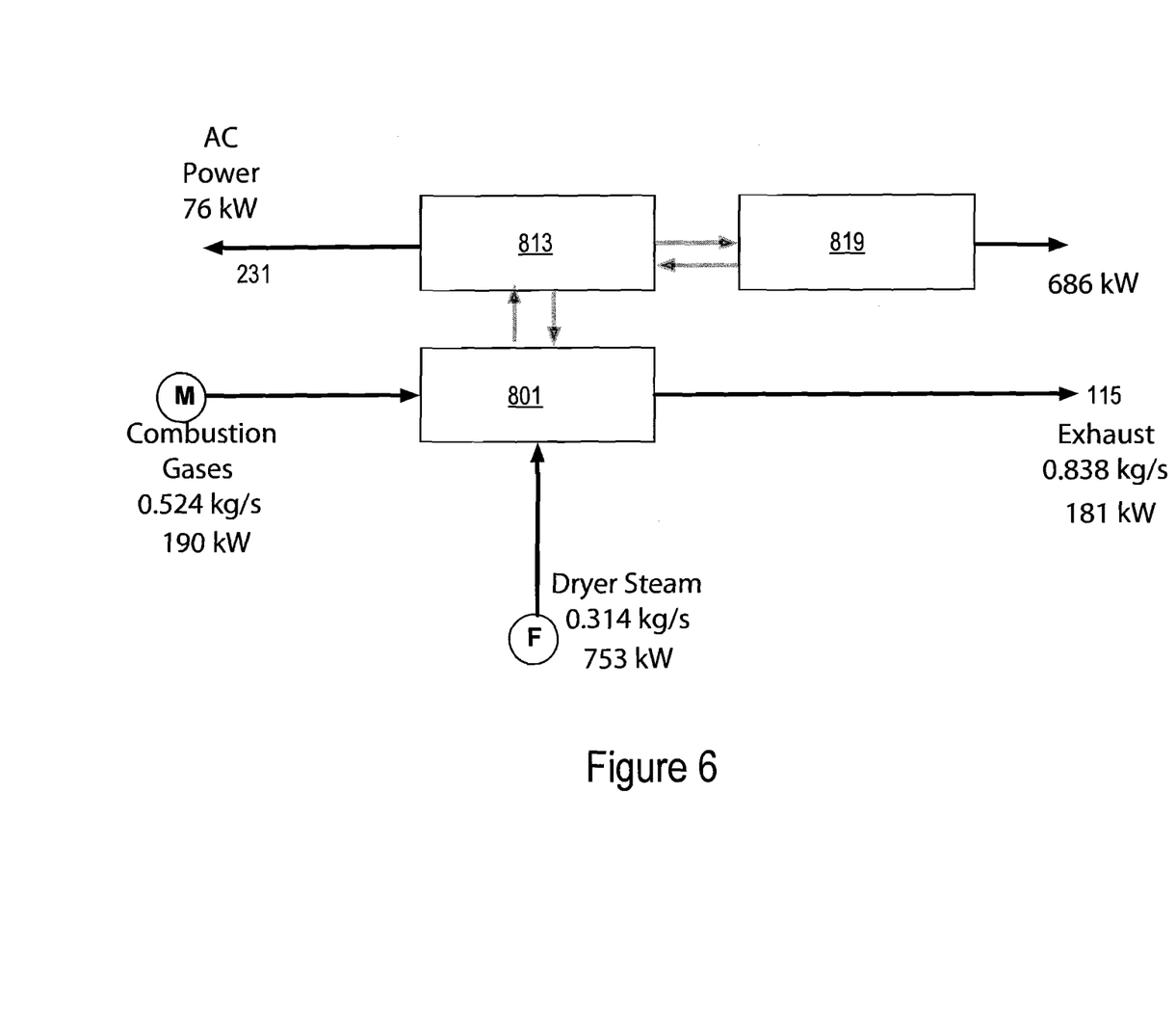
FIG. 6 shows the flow of mass and chemical energy in a power generator.

FIGS. 5 through 6 show the mass flow and energy flow in the system, and indicate that that there is sufficient energy in the torrefaction gases to operate the entire system, and thus provide "stand-alone" operation, where biomass may be converted to biocoal without the need for additional fuel or electricity.

FIG. 5 shows the flow of mass and chemical energy at various points in system 200. Importantly, the amount of energy in the biofuel (5971 kW) is a substantial fraction of the energy available in the original biomass (7056 kW) and is in a much more useful state, being compatible with coal. In addition, a significant amount of electrical power (76 kW) is available for running system 200.

FIG. 6 shows the flow of mass and sensible energy in power generator 230. The torrefaction gases have 190 kW of chemical energy which is supplemented by the sensible energy in the steam and which provides for 76 kW of electrical energy.

It is expected that apparatus 200 may be used to convert biomass to biofuel over a wide range of conditions. Thus, for example, biomass may have a water content of from approximately 5% to approximately 60%, and have varying amounts of lignin and other compounds. In addition, it may be desirable to produce a biofuel having a controlled energy content and/or density.

Thus, for example, the biofuel may have a heating value of between 9,000 Btu per pound (20934 kJ/kg) and 12,000 Btu per pound (28,000 kJ/kg) on an ash free basis, and a density after densification of between 0.8 g/cm$^3$ (800 kg/m$^3$) and 1.4 g/cm$^3$ (1400 kg/m$^3$). The heat value, which is greater that that of the biomass, is accomplished by heating the biomass in the absence of oxygen, allowing water and volatile organic compounds resulting from the breakdown the cellulose and hemicellulose to be created and driven off. The high density is accomplished through maintaining the temperature below the level where the lignin is significantly chemically altered, and by subsequent compression into pellets.

For the simpler case of a single auger drier and torrefier, the dwell time (set by the auger speed, inch/min, controlled by 747), heat exchanger temperature (set by the pressure of the heat transfer fluid, 300° C./2 bar (0.2 MPa) of 721, measured at P12), and load size (set by the feed auger, kg/min of 101, controlled by 637) are all be independent and can be used in combination. Thus, for example, at constant temperature and load rate, low moisture content feedstock will move faster through the auger (i.e. 15 minutes) compared to a high moisture content feedstock (i.e. 30 minutes). Alternatively, at constant temperature and auger speed, a higher feed rate is appropriate for the dry material. Further, at constant auger speed and feed rate, a higher temperature is appropriate for the wet feedstock.

The torrefaction gas production rate is correlated to the torrefied solid product production rate by:

Feedstock HHV=Torr Gas HHV+Torr Biomass HHV

At constant feedstock moisture content, temperate and feed rate, higher torr gas rates are accomplished by reducing the auger speed, with the result that the solid product has both lower total energy, and higher energy density. Similarly with temperature and feed rate.

The energy in the Torr gas is needed to dry, torrefy and produce power. The energy to torrefy is constant across moisture content. The energy required to dry is linearly related to the moisture mass in the feedstock. The power required is directly related to production rate, as the major electrical loads of pressurizing air, grinding and densification are proportional to throughput.

EXAMPLE

Figure 7:
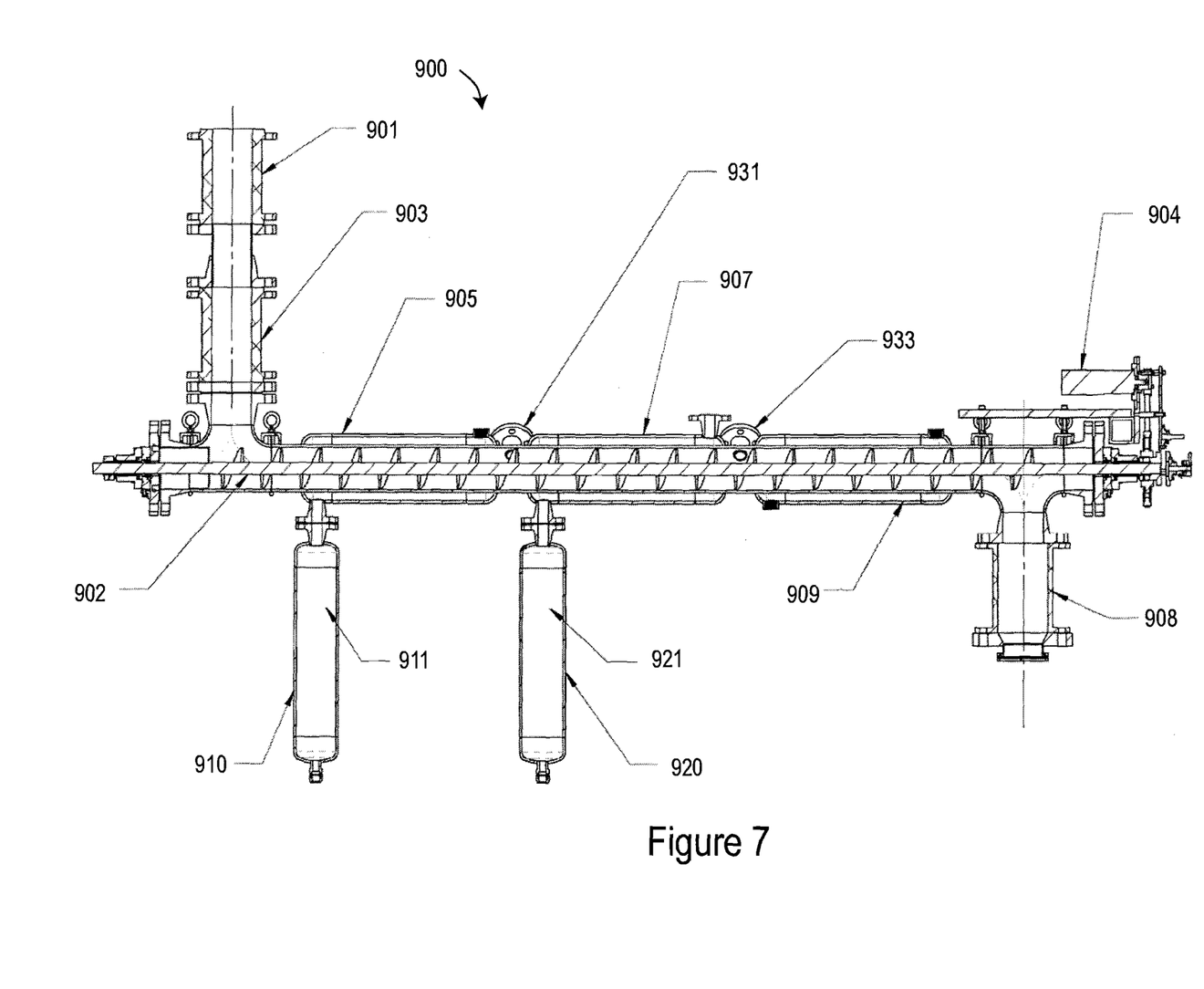
FIG. 7 is a schematic of a proof-of-principle heat exchanger.

FIG. 7 is a schematic of a proof-of-principle heat exchanger 900 constructed to verify the ability to torrefy biomass. Biomass is provided to upper load lock 901 and transferred through pinch valve to lower load lock 903 and to an output load lock 908. Heat exchanger 900 includes a single auger 902 having an auger motor drive 904 that moves biomass through a vapor condensing zone 905, a vapor condensing zone 907, and a fluid heating zone 909. Heat exchanger 900 also includes a first boiler 910 to maintain a first heat transfer fluid level 911, a second boiler 920 to maintain a second heat transfer fluid level 921. Torr gases could be sampled at ports 931 and 933.

Vapor condensing zone 905 corresponds to biomass dryer 310, vapor condensing zone 907 corresponds to biomass torrefier 320, and fluid heating zone 909 corresponds to cooling biomass cooler 330.

The auger had a 4" diameter auger, was 8 feet (2.5 m) long and had a screw pitch of 4 inches (0.1 m). The auger is driven by a DC motor with gear reduction head. Typical rotation speed is 4.9 rotations per minute (RPM), both forward and reverse.

The process is preferably conducted in the absence of oxygen. A pinch valve load lock was constructed using 5 inches (0.13 m) pinch valves, and a $CO_2$ purge gas was used. The process was conducted with heat exchanger 900 at a temperature set point between approximately 250° C. and 300° C. The process auger system was divided into three equally sized zones 905, 907, and 909. The temperature of each zone can be independently controlled and the power consumed independently monitored.

Heat exchanger 900 was designed to deliver 5 lbs per hour (2.3 kg/hr), and included unattended operation and delivery of biocoal grade torrefied biomass plus recovery of the torr gas for analysis. The prototype was also engineered with sensors and data logging capability to help define and understand the process, monitor energy flow and assess effect of variations on process yield.

An input hopper (not shown) was designed to hold approximately 20 lbs (9 kg) of biomass. Biomass was chipped prior to loading and contained approximately 10% moisture by weight. A 2 inch (0.05 m) diameter single screw auger that moves the biomass from the input hopper to the input load lock. The amount of load placed in the load lock in each operation is regulated by run time of the hopper's auger. A run time of 8 seconds transfers approximately 0.035 kg of biomass to the load lock. This is the standard operating setting. A new sample is added approximately every 45 seconds which produces a raw biomass flow rate of approximately 6 lb/hour (2.7 kg/hr).

In a typical process, all three zones are set to 300° C. and controlled by independent PID loops, with DOWTHERM™ A as the heat transfer fluid. To maintain the nominal operating temperature of 300° C., the DOWTHERM™ A boiled at a nominal pressure of between 0.20 and 0.22 MPa absolute.

Heat exchanger 900 has been used to produce torrefied biomass, which has been tested by use in a commercial boiler. In one series of tests, heat exchanger 900 was operated for 2.4 hours to produce torrefied product at 4.5 lb/hr (2 kg/hr) from an input of 6.25 lb/hr (2.83 kg/hr) raw biomass. There was no evidence of coking in heat exchanger 900.

The biomass feedstock had a higher heating value energy content of 16.3 MJ/kg. The energy content of the biofuel was found to be 20.9 MJ/kg via an oxygen bomb calorimeter. The moisture content of the biofuel was 2.1% on a dry basis In addition, heat exchanger 900 was used to test the ability to process different feedstocks. Specifically:

Testing showed that 50% moisture content biomass could be dried to 20% MC in 15 minutes, at a feed rate of 6 dry pounds per hour (2.7 kg/hr). This suggests that 40% moisture content could be completely dry in 15 min, which is used as a calibration point in the analysis above.

Testing also showed that 6 dry lbs (2.7 kg) of 10% moisture content biomass could be dried and torrefied in 15 min. Water evaporated per hour 2.64 pounds (1.2 kg), which was used as another calibration point in the analysis above.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus for processing a biomass, said apparatus comprising:
    a closed-loop heat transfer circuit having a heat transfer fluid;
    a heat exchanger having an input for accepting biomass, a first output for providing torrefied biomass, a second output for providing torrefaction gases, and a surface in contact with condensing heat transfer fluid of the heat transfer circuit for condensing the heat transfer fluid; and
    a chemical reactor for extracting chemical energy from the torrefaction gases and boiling the heat transfer fluid.

2. The apparatus of claim 1, where said heat exchanger has a dryer section and a torrefaction section and includes outputs for recovering water from the biomass prior to the biomass entering the torrefaction section and outputs for the torrefaction gases.

3. The apparatus of claim 1, further comprising:
    a heat engine to generate electricity from heat extracted from the condensation of the heat transfer fluid.

4. The apparatus of claim 3, where said electricity is sufficient to operate said apparatus as a stand-alone apparatus.

5. The apparatus of claim 3, where said heat engine is a Rankine cycle engine.

6. The apparatus of claim 1, where said heat transfer fluid is a mixture of biphenyl ($C_{12}H_{10}$), diphenyl oxide ($C_{12}H_{10}O$), poly-phenyls, and halogenated derivatives thereof.

7. The apparatus of claim 1, where substantially all of the gases in the heat exchanger are provided from drying and/or torrefying the biomass.

8. The apparatus of claim 1, where said chemical reactor is a catalytic combustor.

9. The apparatus of claim 1, where a substantial portion of said chemical reactor is in indirect contact with a liquid phase of the heat transfer fluid.

10. An apparatus for converting a biomass into a coal-like biofuel, said apparatus comprising:
    a heat exchanger having an input for accepting biomass, a first output for providing at least partially dried biomass, a second output for providing steam obtained from the biomass; and
    a heat engine to generate electricity from heat extracted from the steam.

11. The apparatus of claim 10, where said heat exchanger is a first heat exchanger, and further comprising:
    a closed-loop heat transfer circuit having a heat transfer fluid;
    a second heat exchanger having an input for accepting biomass from said first heat exchanger, a first output for providing torrefied biomass, a second output for providing torrefaction gases, and a surface in contact with condensing heat transfer fluid of the heat transfer circuit for condensing the heat transfer fluid; and
    a chemical reactor for extracting chemical energy from the torrefaction gases and boiling the heat transfer fluid.

12. The apparatus of claim 11, where said electricity is sufficient to operate said apparatus as a stand-alone apparatus.

13. The apparatus of claim 10, where said heat engine is a Rankine cycle engine.

14. The apparatus of claim 11, where said heat transfer fluid is a mixture of biphenyl ($C_{12}H_{10}$), diphenyl oxide ($C_{12}H_{10}O$), poly-phenyls, and halogenated derivatives thereof.

15. The apparatus of claim 11, where substantially all of the gases in the heat exchanger are provided from drying and/or torrefying the biomass.

16. The apparatus of claim 11, where said chemical reactor is a catalytic combustor.

17. The apparatus of claim 11, where a substantial portion of said chemical reactor is in indirect contact with a liquid phase of the heat transfer fluid.

* * * * *